US006904476B2

(12) United States Patent
Hedtke

(10) Patent No.: US 6,904,476 B2
(45) Date of Patent: Jun. 7, 2005

(54) TRANSMITTER WITH DUAL PROTOCOL INTERFACE

(75) Inventor: Robert C. Hedtke, Young America, MN (US)

(73) Assignee: Rosemount Inc., Eden Prairie, MN (US)

(*) Notice: Subject to any disclaimer, the term of this patent is extended or adjusted under 35 U.S.C. 154(b) by 0 days.

(21) Appl. No.: 10/407,292

(22) Filed: Apr. 4, 2003

(65) Prior Publication Data

US 2004/0199681 A1 Oct. 7, 2004

(51) Int. Cl.[7] .......................... G06F 13/12; G06F 13/42
(52) U.S. Cl. ......................... 710/72; 710/105; 710/106
(58) Field of Search .......................... 702/113; 710/105, 710/37, 106, 38, 72; 700/19, 79; 707/203

(56) References Cited

U.S. PATENT DOCUMENTS

| | | | |
|---|---|---|---|
| 3,670,310 A | 6/1972 | Bharwani et al. | 340/172.5 |
| 4,554,631 A | 11/1985 | Reddington | 364/300 |
| 4,627,019 A | 12/1986 | Ng | 364/900 |
| 4,674,066 A | 6/1987 | Kucera | 364/900 |
| 4,817,036 A | 3/1989 | Millett et al. | 364/900 |
| 4,821,180 A | 4/1989 | Gerety et al. | 364/200 |
| 4,823,306 A | 4/1989 | Barbic et al. | 364/900 |
| 4,852,041 A | 7/1989 | Nakano | 364/900 |
| 4,855,905 A | 8/1989 | Estrada et al. | 364/200 |
| 4,884,287 A | 11/1989 | Jones et al. | 375/121 |
| 4,945,473 A | 7/1990 | Holtey et al. | 364/200 |
| 4,975,829 A | 12/1990 | Clarey et al. | 364/200 |
| 5,007,013 A | 4/1991 | Elms | 364/900 |
| 5,424,650 A | 6/1995 | Frick | 324/688 |
| 5,481,200 A | 1/1996 | Voegele et al. | 324/718 |
| 5,573,032 A | 11/1996 | Lenz et al. | 137/486 |
| 5,610,552 A | 3/1997 | Schlesinger et al. | 327/560 |
| 5,764,891 A | 6/1998 | Warrior | 395/200.2 |
| 6,377,859 B1 * | 4/2002 | Brown et al. | 700/79 |
| 6,449,624 B1 * | 9/2002 | Hammack et al. | 707/203 |

(Continued)

FOREIGN PATENT DOCUMENTS

| | | |
|---|---|---|
| DE | 196 46 219 A1 | 12/1997 |
| GB | 2 243 748 A | 11/1991 |
| WO | WO 93/08652 | 4/1993 |
| WO | WO 03/013104 | 2/2003 |

OTHER PUBLICATIONS

"Automation for the Future: An Integrated Process–Wide Control, Switching and Drive Concept," by M. Deppe et al., *Engineering & Automation*, vol. 17, No. 5, Sep.–Oct. 1995, pp. 14–15.

"HI 311 HART® Serial Interface", SMAR, Sep. 1996, pp. 2–7.

FB BOARD™ Fieldbus Interface Board, SMAR, Sep. 1996, pp. 2–11.

(Continued)

*Primary Examiner*—Jeffrey Gaffin
*Assistant Examiner*—Joshua D Schneider
(74) *Attorney, Agent, or Firm*—Westman, Champlin & Kelly, P.A.

(57) ABSTRACT

A two-wire process transmitter for use in monitoring an industrial process includes HART® communication circuitry and Fieldbus communication circuitry to couple to a two-wire process control loop. A first pair of electrical terminals is provided to couple the HART® communication circuitry to the two-wire process control loop in a first configuration, and a second pair of electrical terminals is provided to couple the Fieldbus communication circuitry to the two-wire process control loop in an alternative second configuration.

27 Claims, 3 Drawing Sheets

U.S. PATENT DOCUMENTS

| | | | |
|---|---|---|---|
| 6,449,715 B1 | 9/2002 | Krivoshein | 713/1 |
| 6,457,367 B1 | 10/2002 | Behm et al. | 73/753 |
| 6,484,107 B1 | 11/2002 | Roper et al. | 702/50 |
| 6,487,912 B1 | 12/2002 | Behm et al. | 73/753 |
| 6,504,489 B1 | 1/2003 | Westfield et al. | 340/870.3 |
| 6,510,740 B1 | 1/2003 | Behm et al. | 73/708 |
| 6,511,337 B1 | 1/2003 | Fandrey et al. | 439/320 |
| D471,829 S | 3/2003 | Dennis et al. | D10/85 |
| D472,831 S | 4/2003 | Dennis et al. | D10/85 |
| 6,546,805 B2 | 4/2003 | Fandrey et al. | 73/753 |
| 6,568,279 B2 | 5/2003 | Behm et al. | 73/756 |
| 6,571,132 B1 | 5/2003 | Davis et al. | 700/2 |
| 6,574,515 B1 * | 6/2003 | Kirkpatrick et al. | 700/19 |
| 6,629,059 B2 * | 9/2003 | Borgeson et al. | 702/183 |
| 2002/0167904 A1 | 11/2002 | Borgeson et al. | 370/241 |
| 2003/0023795 A1 * | 1/2003 | Packwood et al. | 710/105 |

OTHER PUBLICATIONS

FB STACK™ Fieldbus Communication Stack, SMAR, Oct. 1996, pp. 2–11.

Product Data Sheet 2634 for "Series 7500 System V. Hydrostatic Tank Gauging System Software and Tank Scanning Unit (TSU)," Rosemount Inc. 1988.

U.S. Appl. No. 09/564,506, filed May 4, 2000, Nord et al.

U.S. Appl. No. 09/638,181, filed Jul. 31, 2000, Roper et al.

U.S. Appl. No. 09/667,289, filed Sep. 22, 2000, Westfield et al.

Document No. 33–07787, 6810 Series Tank Scanning Unite-Hardware, Instruction Manual, for Varec, a Rosemount Division.

Siemens "The New Field Devices Bring You Flexible Communication—Whatever Your System Concept," by Siemens AG of Germany.

Document No. FF–94–890, the Fieldbus Foundation, "Fieldbus Foundation Fieldbus Specification Function Block Application Process Part 1," 1996 pp. 1–119.

Document No. FF–94–891, the Fieldbus Foundation, "Fieldbus Foundation Fieldbus Specification Block Application Process Part 2," 1996 pp. 1–55.

1 Page entitled, "Remote Mount Meter Wiring Diagram Correction", Model 3051S Series, Emerson Process Management, Mar. 2002.

Product Data Sheet 00813–0100–4801, Rev BA, Model 3051 S Series, pp. 14–20, Jan. 2002.

* cited by examiner

TRANSMITTER WITH DUAL PROTOCOL INTERFACE

BACKGROUND OF THE INVENTION

The present invention relates to the process control industry. More specifically, the present invention relates to field devices used in the process control industry which communicate using two-wire process control loops.

Field devices such as transmitters, are used in the process control industry to remotely sense a process variable. The process variable may be transmitted to a control room for use in controlling the process or for providing information about process operation to a controller. For example, information related to pressure of process fluid may be transmitted to a control room and used to control the process, such as oil refining. Another type of field device, for example, is a valve controller.

One typical prior art technique for transmitting information involves controlling the amount of current flowing through a process control loop. Current is supplied from a current source in the control room and the transmitter controls the current from its location in the field. For example, a 4 mA signal can be used to indicate a zero reading and a 20 mA signal can be used to indicate a full scale reading. More recently, transmitters have employed digital circuitry which communicates with the control room using a digital signal which is superimposed onto the analog current signal flowing through the process control loop. Some techniques send purely digital signals. One example of such a technique is the HART® communication protocol proposed by Rosemount Inc. The HART® protocol and other such protocols typically include a set of commands or instructions which can be sent to the transmitter to elicit a desired response, such as transmitter control or interrogation.

Fieldbus is a communications protocol proposed by the Fieldbus Foundation and is directed to defining a communications layer or protocol for transmitting information on a process control loop. In the Fieldbus protocol, the current flowing through the loop is not used to transmit an analog signal. Instead, all information is digitally transmitted. Further, the Fieldbus standard allows transmitters to be configured in a multi-drop configuration in which more than one transmitter is connected on the same process control loop.

The Fieldbus standard is a specification promulgated by the Fieldbus foundation. The process interface specification is defined in "The Fieldbus Foundation, Fieldbus Specification, Function Block Application Process Parts 1 and 2", Documents FF-94-890 and FF-94-891, Revision H1 Final 2.0, Jan. 2, 1996. The Fieldbus standard is an open standard which provides communication between process I/O hardware and the Fieldbus interface through an arbitrary number of data channels, each having an arbitrary number of parameters associated therewith. A Fieldbus process interface specification (transducer block) appears as shown in Table 1:

TABLE 1

| Channel Data |
| --- |
| Parameter 1 |
| Parameter 2 |
| Parameter 3 |
| . |
| . |
| Parameter N |

TABLE 1-continued

Fieldbus interface circuitry in the transmitter reads and writes the channel data and parameters 1-N through software constants termed "function blocks" in the Fieldbus Foundation Specification.

SUMMARY

A two-wire process transmitter for use in monitoring an industrial process includes HART® communication circuitry configured to couple to a two-wire process control loop and operate in accordance with HART® communication protocol. The HART® communication circuitry completely powers the transmitter with power received from the two-wire process control loop. Fieldbus or Profibus communication circuitry is configured to couple to the two-wire process control loop and operate in accordance with Fieldbus or Profibus communication protocol and completely power the transmitter with power received from the two-wire process control loop. A first pair of electrical terminals is adapted to couple the HART® communication circuitry to the two-wire process control loop in a first configuration, and a second pair of electrical terminals is adapted to couple the Fieldbus or Profibus communication circuitry to the two-wire process control loop in an alternative second configuration.

DETAILED DESCRIPTION

Figure 1:
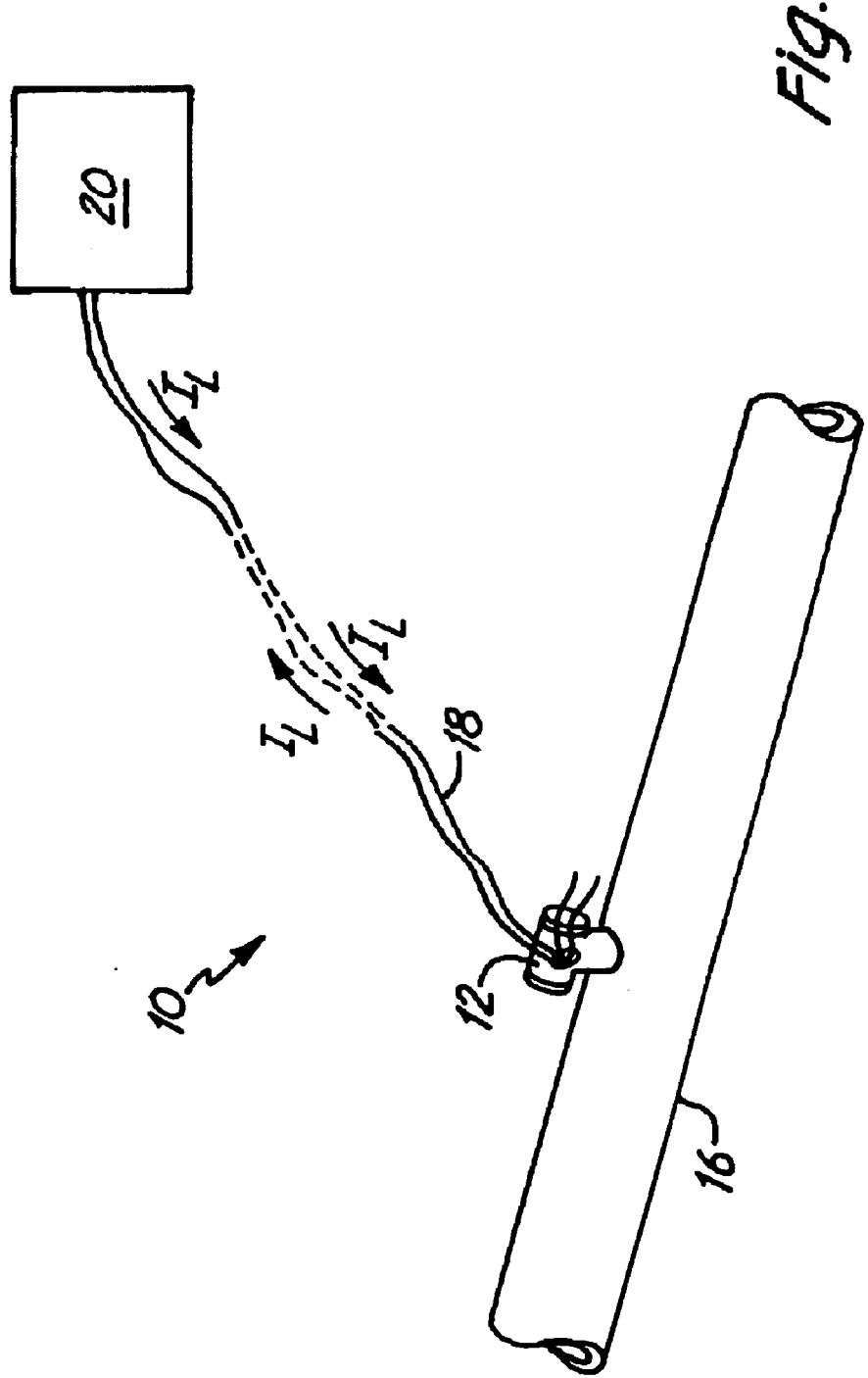
FIG. 1 is a diagram of the process control system including a transmitter in accordance with the present invention.

FIG. 1 is a diagram of process control system 10 which includes a transmitter 12 connected to process pipe 16. Transmitter 12 is coupled to a two-wire process control loop which operates in accordance with the Fieldbus or HART® standard. Two-wire process control loop 18 runs between transmitter 12 and the control room 20. In an embodiment in which loop 18 operates in accordance with the HART® protocol. Loop 18 can carry a current $I_L$ which is representative of a sensed process variable. Additionally, the HART® protocol allows a digital signal to be superimposed on the current through loop 18 such that digital information can be sent to or received from transmitter 12. When operating in accordance with the Fieldbus standard, loop 18 carries a digital signal and can be coupled to multiple field devices such as other transmitters.

Figure 2:
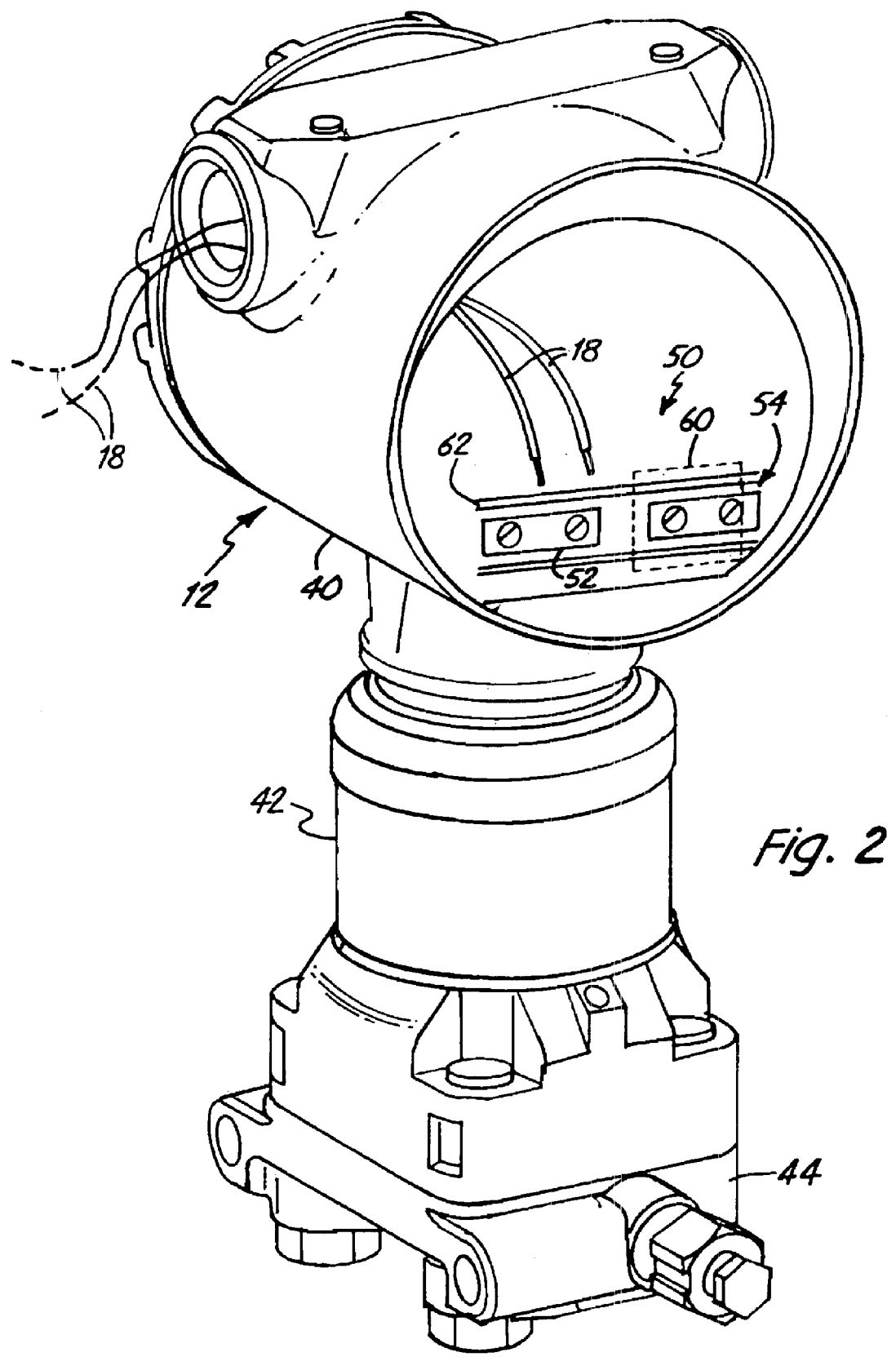
FIG. 2 is a perspective view of a transmitter shown in FIG. 1 in which an end cap has been removed.

The present invention provides a transmitter with a multiprotocol interface in which the transmitter 12 can be coupled to loop 18 in accordance with either the HART® communication protocol or the Fieldbus communication protocol. FIG. 2 is a perspective view of transmitter 12 in which one end cover has been removed from a feature module 40. The feature module 40 is coupled to a super module 42 which couples to process piping 16 (not shown in FIG. 2) through manifold process coupling 44.

Feature module 40 includes a terminal block 50 having a first pair of electrical terminals 52 and a second pair of electrical terminals 54. Each pair of terminals 52 and 54 is configured to couple to the two wires from two-wire process control loop 18. Electrical terminals 52 are configured for coupling to loop 18 when loop 18 operates in accordance with the HART® protocol while electrical terminals 54 are alternately configured to couple to loop 18 when the loop is operating in accordance with the Fieldbus protocol. A slide plate 60 slides along tracks 62 and selectively covers either terminals 52 or 54 such that only one set of terminals (terminals 52 or 54) can be accessed at a time. This prevents an operator from coupling transmitter 12 to simultaneously to two process control loops.

Figure 3:
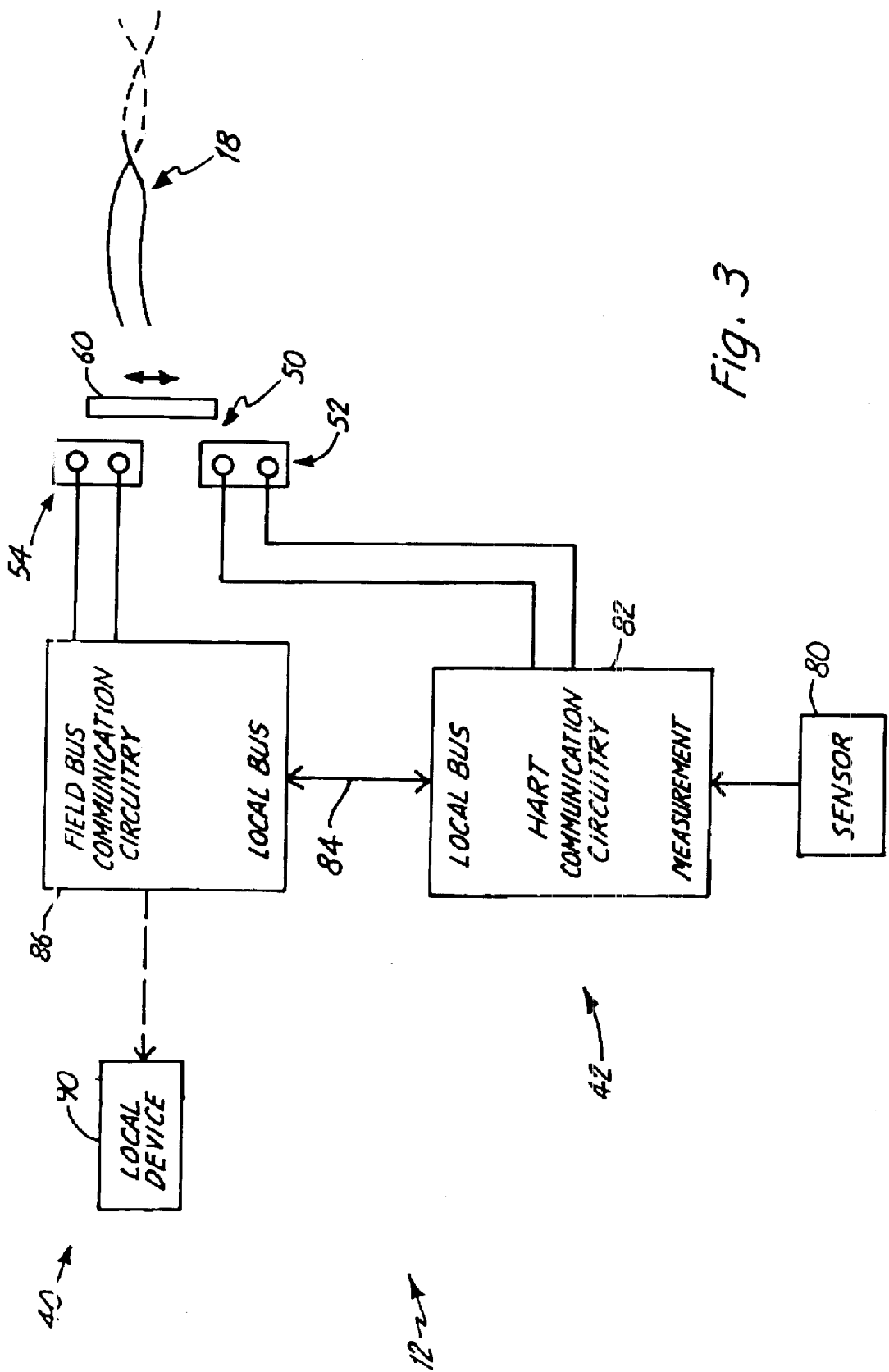
FIG. 3 is a simplified block diagram showing electrical circuitry of the transmitter of FIG. 2.

FIG. 3 is a simplified block diagram showing electrical circuitry of transmitter 12 in accordance with one embodiment of the present invention. As illustrated in FIG. 3, super module 42 includes a process variable sensor 80 which couples to HART® communication circuitry 82 through a measurement circuitry coupling. The HART® communication circuitry 82 couples to terminals 52 of a terminal block 50. Local bus communication circuitry is also provided in super module 52 which communicates along a local bus 84 to local bus communication circuitry in a Fieldbus communication circuit 86 located in feature module 40. Fieldbus communication circuitry 86 couples to terminals 54 and to an optional local device 90. One example local device 90 is a display for displaying information from transmitter 12.

In operation, process control loop 18 is coupled to either the electrical terminals 52 for communication in accordance with the HART® protocol or to terminals 54 for communication in accordance with the Fieldbus protocol. When connected to terminals 54, Fieldbus communication circuitry 86 receives electrical power from control loop 18 to completely power transmitter 12. Circuitry 86 communicates with circuitry 82 over local bus 84 and provides power to circuitry 82. Process variable measurements are obtained using sensor 80 and provided to Fieldbus communication circuitry over bus 84. The measured process variable or information related to the process variable can be digitally transmitted in accordance with the Fieldbus protocol by Fieldbus communication circuitry 86 through terminals 54 and over process control loop 18, Fieldbus communication circuitry 86 can provide power to and communicate with an operational local device 90. For example, local device 90 can comprise a local display to display information from the transmitter 12 such as information related to the measured process variable, configuration information, etc.

On the other hand, when process control loop is coupled to electrical terminal 52, HART® communication circuitry 82 receives power from loop 18 to completely power transmitter 12. A process variable measurement is obtained using sensor 80 and can be transmitted, either in an analog or a digital format as set forth in accordance with the HART® protocol, over process control loop 18 through electrical terminals 52. In this configuration, power is provided to the optional local device 90 over local bus 84 and through the Fieldbus communication circuitry 86. In some embodiments, circuitry in Fieldbus communication circuitry is powered by the HART® communication circuitry 82 in order to access additional functionality. HART® communication circuitry 82 can provide a local output, such as to a local display, using local device 90.

The configuration of the present invention does not require a switch to selectively couple a single pair of input terminals to either Fieldbus or HART® communication circuitry. Instead, two separate pairs of electrical connections are provided which couple either to the Fieldbus communication circuitry 86 or the HART® communication circuitry 82. This provides a simple implementation which is not susceptible to the failure of a switch. Further, as the terminals are configured such that only a single pair can be used at any one time, the likelihood of user error is reduced. This configuration is achieved using the slide plate 60 which blocks the other pair of terminals. The circuitry of the present invention can be configured as desired and the block diagram set forth in FIG. 3 is only one example. Example implementations are set forth in U.S. Pat. No. 6,457,367, issued Oct. 1, 2002; U.S. Pat. No. 6,484,107, issued Nov. 19, 2002; U.S. Pat. No. 6,487,912, issued Dec. 3, 2002; U.S. Pat. No. 6,504,489, issued Jan. 7, 2003; U.S. patent application Ser. No. 09/520,292, filed Mar. 7, 2000; U.S. patent application Ser. No. 09/564,506, filed May 4, 2000; U.S. patent application Ser. No. 09/638,181, filed Jul. 31, 2000; U.S. patent application Ser. No. 09/667,399, filed Sep. 21, 2000; U.S. patent application Ser. No. 09/667,289, filed Sep. 22, 2000; U.S. patent application Ser. No. 09/671,130, filed Sep. 27, 2000; U.S. patent application Ser. No. 09/867,961, filed May 30, 2001; U.S. patent application Ser. No. 29/149,556, filed Oct. 11, 2001; U.S. patent application Ser. No. 29/149,555, filed Oct. 11, 2001; and U.S. patent application Ser. No. 10/125,286, filed Apr. 18, 2002.

In another embodiment, circuitry 86 comprises Profibus communication circuitry such that transmitter 12 can couple to a two-wire process control loop which operates in accordance with the Profibus communication standard.

Although the present invention has been described with reference to preferred embodiments, workers skilled in the art will recognize that changes may be made in form and detail without departing from the spirit and scope of the invention.

What is claimed is:

1. A two-wire process transmitter for use in monitoring an industrial process, comprising:
    HART® communication circuitry configured to couple to a two-wire process control loop and operate in accordance with HART® communication protocol and completely power the transmitter with power received from the two-wire process control loop;
    Fieldbus communication circuitry configured to couple to the two-wire process control loop and operate in accordance with Fieldbus communication protocol and completely power the transmitter with power received from the two-wire process control loop;
    a first pair of electrical terminals adapted to couple the HART® communication circuitry to the two-wire process control loop in a first configuration; and
    a second pair of electrical terminals adapted to couple the Fieldbus communication circuitry to the two-wire process control loop in an alternative second configuration.

2. The transmitter of claim 1 including a sensor coupled to HART® and Fieldbus communication circuitry to sense a process variable.

3. The transmitter of claim 1 including a separate local device which is completely powered with power received from the process control loop.

4. The transmitter of claim 3 wherein the local device comprises a display.

5. The transmitter of claim 3 wherein the local device is coupled to the Fieldbus communication circuitry.

6. The transmitter of claim 1 including a sliding plate slidably positioned over the first pair of electrical terminals and the second pair of electrical terminals whereby only one pair of electrical terminals is accessible at a time.

7. The transmitter of claim 1 including a sensor electrical coupled to the HART® communication circuitry.

8. The transmitter of claim 1 including a local bus which electrically couples the HART® communication circuitry with the Fieldbus communication circuitry.

9. The transmitter of claim 1 wherein the Fieldbus communication circuitry provides power to the HART® communication circuitry when the process control loop is coupled the second pair of terminals.

10. The transmitter of claim 1 wherein the HART® communication circuitry provides power to the Fieldbus communication circuitry when the process control loop is coupled to the first pair of electrical terminals.

11. A two-wire process transmitter for use in monitoring an industrial process, comprising:
    HART® communication means for coupling to a two-wire process control loop, operating in accordance with HART® communication protocol and completely powering the transmitter with power received from the two-wire process control loop;
    Fieldbus communication means for coupling to the two-wire process control loop, operating in accordance with Fieldbus communication protocol and completely powering the transmitter with power received from the two-wire process control loop;
    a first electrical terminal means for coupling the HART® communication circuitry to the two-wire process control loop in a first configuration; and
    a second electrical terminal means for coupling the Fieldbus communication circuitry to the two-wire process control loop in an alternative second configuration.

12. A method of coupling a two-wire process transmitter to a two-wire process control loop, comprising:
    providing HART® communication circuitry configured to couple to a two-wire process control loop and operate in accordance with HART® communication protocol and completely power the transmitter with power received from the two-wire process control loop;
    providing Fieldbus communication circuitry configured to couple to the two-wire process control loop and operate in accordance with Fieldbus communication protocol and completely power the transmitter with power received from the two-wire process control loop;
    providing a first pair of electrical terminals adapted to couple the HART® communication circuitry to the two-wire process control loop in a first configuration; and
    providing a second pair of electrical terminals adapted to couple the Fieldbus communication circuitry to the two-wire process control loop in an alternative second configuration.

13. The method of claim 12 including coupling the first pair of electrical terminals to a two-wire process control loop operating in accordance with HART® communication protocol.

14. The method of claim 12 including coupling the second pair of electrical terminals to a two-wire process control loop operating in accordance with Fieldbus communication protocol.

15. The method of claim 12 including powering a local separate device with power received from the process control loop.

16. The method of claim 15 wherein the local device comprises a display.

17. The method of claim 16 wherein the local device is coupled to the Fieldbus communication circuitry.

18. The method of claim 12 including sliding a plate which is slidably positioned over the first pair of electrical terminals and the second pair of electrical terminals whereby only one pair of electrical terminals is accessible at a time.

19. The method of claim 12 including coupling the HART® communication circuitry to the Fieldbus communication circuitry through a local bus.

20. The method of claim 12 including powering the HART® communication circuitry from the Fieldbus communication circuitry when the process control loop is coupled the second pair of terminals.

21. The method of claim 12 including powering the Fieldbus communication circuitry with the HART® communication circuitry when the process control loop is coupled to the first pair of electrical terminals.

22. A method of coupling a two-wire process transmitter to a two-wire process control loop, comprising:
    providing HART® communication circuitry configured to couple to a two-wire process control loop and operate in accordance with HART® communication protocol and completely power the transmitter with power received from the two-wire process control loop;
    providing Profibus communication circuitry configured to couple to the two-wire process control loop and operate in accordance with Profibus communication protocol and completely power the transmitter with power received from the two-wire process control loop;
    providing a first pair of electrical terminals adapted to couple the HART® communication circuitry to the two-wire process control loop in a first configuration; and
    providing a second pair of electrical terminals adapted to couple the Profibus communication circuitry to the two-wire process control loop in an alternative second configuration.

23. A two-wire process transmitter for use in monitoring an industrial process, comprising:
    Profibus communication circuitry configured to couple to a two-wire process control loop and operate in accordance with Profibus communication protocol and completely power the transmitter with power received from the two-wire process control loop;
    Fieldbus communication circuitry configured to couple to the two-wire process control loop and operate in accordance with Fieldbus communication protocol and completely power the transmitter with power received from the two-wire process control loop;
    a first pair of electrical terminals adapted to couple the HART® communication circuitry to the two-wire process control loop in a first configuration; and
    a second pair of electrical terminals adapted to couple the Fieldbus communication circuitry to the two-wire process control loop in an alternative second configuration.

24. The transmitter of claim 11 including a sensor means for sensing a process variable.

25. The method of claim 12 including sensing a process variable with a sensor in the two-wire process transmitter.

26. The method of claim 22 including sensing a process variable with a sensor in a two-wire process transmitter.

27. The transmitter of claim 23 including a sensor means for sensing a process variable.

* * * * *